(12) United States Patent
Adolph

(10) Patent No.: US 6,435,044 B1
(45) Date of Patent: Aug. 20, 2002

(54) AXLE MEASURING DEVICE AND METHOD

(75) Inventor: Dietrich Adolph, Albershausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/381,137

(22) PCT Filed: Feb. 21, 1998

(86) PCT No.: PCT/DE98/00527

§ 371 (c)(1),
(2), (4) Date: Sep. 15, 1999

(87) PCT Pub. No.: WO98/41816

PCT Pub. Date: Sep. 24, 1998

(30) Foreign Application Priority Data

Mar. 15, 1997 (DE) .......................................... 197 10 837

(51) Int. Cl.⁷ ...................... G01C 19/56; G01C 25/00; G01M 17/007; G01M 17/013

(52) U.S. Cl. ........................ 73/865.9; 33/303; 33/336; 33/533

(58) Field of Search ................. 73/865.9, 1.75, 73/1.77; 33/303, 335, 336, 340, 533, 502, 608, 600, 318, 321, 322

(56) References Cited

U.S. PATENT DOCUMENTS

| | | | | | |
|---|---|---|---|---|---|
| 4,180,915 A | * | 1/1980 | Lill et al. | ................. | 33/336 X |
| RE31,248 E | * | 5/1983 | Berger et al. | ................. | 73/655 |
| 4,613,144 A | * | 9/1986 | Furukawa | ................. | 280/91 |
| 4,939,985 A | * | 7/1990 | Von Thun | ................. | 73/118.1 |
| 5,038,485 A | * | 8/1991 | Beissbarth | ................. | 33/336 X |
| 5,122,960 A | * | 6/1992 | Ooka | ................. | 33/356 X |
| 5,357,817 A | | 10/1994 | Weinberg | ................. | 74/5.34 |
| 5,410,481 A | | 4/1995 | Kriz | ................. | 701/23 |
| 5,515,275 A | * | 5/1996 | Ackermann | ................. | 701/41 |
| 5,640,910 A | * | 6/1997 | Pouyt et al. | ................. | 105/168 |
| 5,889,193 A | * | 3/1999 | Pfaff et al. | ................. | 73/1.37 |
| 6,196,345 B1 | * | 3/2001 | Lyons et al. | ................. | 180/65.8 |

FOREIGN PATENT DOCUMENTS

| | | | | |
|---|---|---|---|---|
| DE | 29 11 580 | | 11/1982 | .......... G01M/17/00 |
| EP | 0 313 563 | | 5/1989 | .......... G01L/19/02 |
| EP | 0 692 421 | | 1/1996 | .......... B61F/5/38 |
| JP | 4-140608 | * | 5/1992 | .......... G01C/21/00 |
| WO | 96 21138 | | 4/1996 | .......... G01C/25/00 |

OTHER PUBLICATIONS

E. Hinüber, "Hochgenaue Kreisel und Beschleunigungssensoren", Elektronik, Jan. 9, 1996. pp. 56–59.

A. Reppich et al., "Yaw Rate Sensor for Vehicle Dynamics Control System", SAE Paper 950537 Detroit, Feb. 27–Mar. 2, 1995. pp. 67–76.

* cited by examiner

Primary Examiner—Thomas P. Noland
(74) Attorney, Agent, or Firm—Kenyon & Kenyon

(57) ABSTRACT

A device and a method for axle alignment, in which an angle between a wheel of a vehicle and a reference direction is determined, the angle being determined using a transducer, which contains at least one rotation speed sensor. The transducer is set so that it assumes a known position with respect to the reference direction. The angle obtained for the transducer arranged on the wheel of the vehicle is a measure of a trail angle or a camber angle of the wheel.

8 Claims, 2 Drawing Sheets

AXLE MEASURING DEVICE AND METHOD

BACKGROUND INFORMATION

European Patent Application No. 313 563 describes a method and a device for wheel position measurement, using a rotating gyroscopic device suspended by a universal joint. An angle measurement device is adjusted to the first wheel. The subsequently started rotation of the gyroscopic device guarantees that the rotation axis of the gyroscopic device, which is used as a reference axis, does not change during the subsequent measurement procedure. The angle measurement device is mounted on the next wheel, and the angle formed between the wheel and the reference axis is measured. This procedure is repeated for all wheels. The differences in orientation of the other wheels compared to the first wheel are measured, stored, and subsequently compared to one another in order to determine the wheel adjustment values. The start-up time of the gyroscopic device used as the reference axis is approximately 15 minutes if a high degree of accuracy is required. As an additional angle transducer required in addition to the gyroscopic device, an incremental angle transducer measures the angle difference between the initial position and the measured position.

SUMMARY OF THE INVENTION

The device for axle alignment of a vehicle according to the present invention, which allows at least one angle to be determined between a wheel of the vehicle and a reference direction, provides that the angle is determined using a transducer having at least one rotation speed sensor, whose output signal is integrated. The use of rotation speed sensors for axle alignment makes it possible to dispense with an exact alignment of the transducers with respect to one another on each wheel of the vehicle. Long setup and adjustment times are avoided. Since each transducer used for axle alignment assumes a known relative position with respect to the reference direction, which does not depend on the vehicle or the arrangement of another transducer, large axle bases or axle offsets of the vehicle to be aligned have no importance. The transducer can be equally used for passenger cars, trucks, trailers or multiaxle vehicles. The rotation angles obtained by integration are used as a measure for a trail angle or camber angle of the vehicle. The rotation angle provides the deviation of the rotation axis coordinates of the wheel from the reference direction. This angle is used as basic data for the algorithm used to determine the trail angle or camber angle.

In one exemplary embodiment, one transducer has three rotation speed sensors forming an orthogonal system. Thus the reference direction can be completely isolated from the vehicle. All information required to compensate interference caused by translational motion is obtained.

In an exemplary embodiment of the axle alignment method according to the present invention, a transducer is provided, which has at least one rotation speed sensor whose output signal is integrated. The transducer is adjusted so that it assumes a known position with respect to a reference direction. Subsequently it is mounted on one wheel of the vehicle. The angle formed is a measure of a trail or camber angle of the vehicle wheel. The rotation speed sensor measures the relative position of the transducer with respect to the reference direction. The transducer no longer has to be arranged in a predefined position on the vehicle wheel. Time-consuming adjustment procedures thus become unnecessary.

In a particular embodiment, a third step is provided, in which the relative position of the rotation axis coordinates of the wheels with respect to the reference direction is determined. Angular offsets of the wheel axles that occur with respect to one another provide information on the correction measures on the axle geometry to be taken.

The particular embodiment of the present invention provides for the compensation for the earth's rotation during angle measurement, increasing the accuracy of angle measurement. Since the rotation speed sensor measures these interfering quantities continuously at rest, a low-maintenance, self-calibrating system can be created.

In a fourth step of a useful refinement, the transducer is set to the same position as in the first step. The previous measurement is then invalid if the angle obtained in the fourth step differs significantly from zero. Interference affecting the measurement can be controlled without major expense. This measure contributes to more userfriendly automation.

DETAILED DESCRIPTION

Figure 1:
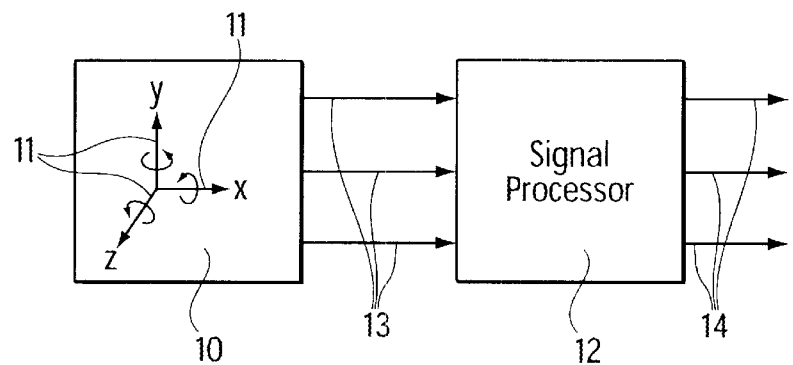
FIG. 1 shows a block diagram of an exemplary embodiment of a device according to the present invention.
Figure 2:
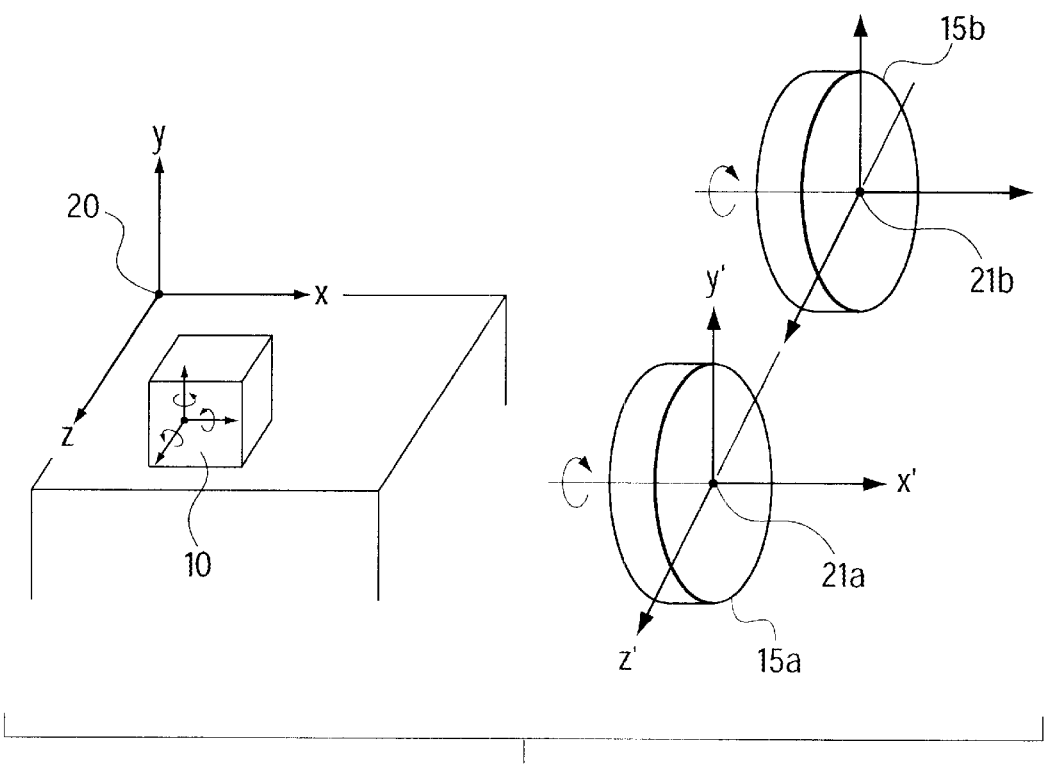
FIG. 2 shows a spatial arrangement.

A transducer 10 is constructed from three rotation speed sensors 11 arranged orthogonally to one another. Each of rotation speed sensors 11 delivers a rotation speed 13 to a signal processor 12, which converts the input signals into angle 14. As shown in FIG. 2, transducer 10 assumes a certain position with respect to a reference direction 20. In spatial proximity to transducer 10, two wheels 15*a*, 15*b* to be aligned are located. Rotation axis coordinates 21*a*, 21*b* are assigned to each wheel 15*a*, 15*b*; one axis of these coordinates coincides with the rotation axis of the respective wheel 15*a*, 15*b*.

Rotation speed sensors 11 measure rotation speed 13 of a part rotating about an axis. The respective measurement systems are based on different physical effects. Angular velocity is one synonym for the rotation speed to be measured. For a mechanical gyroscopic device, the rotation to be measured creates a moment that is proportional to the rotation speed. Translational effects on the gyroscopic device must be compensated for using appropriate error models. In a fiber optic gyroscopic device, the difference in the speed of propagation of light due to rotation is one measure of the rotation speed to be measured. The phase shift of the measured signal with respect to a reference signal, determined by an interference detector, is proportional to the angular velocity. In a ring laser gyroscope, two light wave trains rotate around a surface in opposite directions. The rotation of the ring laser to be measured changes the effective ring resonator length. The resulting frequency difference of the light frequencies of the light wave trains is a measure of the rotation speed. Further details can be found in the article "Hochgenaue Kreisel und Beschleunigungssensoren" (High-Precision Gyroscopes and Acceleration Sensors) by E. v. Hinüber, Elektronik January 1996.

In the case of oscillating gyroscopes, vibrating structures, configured, for example, as tuning forks or cylindrical bodies, are made to vibrate. Acceleration sensors measure the Coriolis acceleration that depends on the rotation to be measured as a measure of the rotation speed. For details see also "Yaw rate sensor for vehicle dynamics control system"

by A. Reppich, R. Willig, SAE Paper, Detroit 1995. Rotation speed sensor 11 is, however, by no means restricted to the physical principles described above. Instead, the essential thing is that rotation speed 13 is available as an output signal of rotation speed sensor 11.

For axle alignment, it is important to know the angle by which the individual wheel geometries are offset with respect to one another. Signal processor 12 converts rotation speed 13 into an angle 14 by integrating rotation speed 13 over time. For example, if rotation speed sensor 11 detects a rotation speed 13 about the X axis, it delivers the respective angle 14 indicating how far the y/z plane has rotated about the x axis since the start of the integration. Normally, a translational motion is superimposed on the rotation. This interference component must be compensated through transformation differential equations. If there is a continuous curve of rotation speed 13, integration can be performed by electronic components. For discrete values, known algorithms are available to determine angle 14. The time of start of integration should be communicated to signal processor 12. At this time, transducer 10 is in its reference position. If transducer 10 is made up of three rotation speed sensors 11 arranged orthogonally to one another, all three rotation speeds 13 should be integrated and compensated in the event of a translational component. In addition to translation, the rotation of the earth appears as another interfering factor. Its influence on the horizontal angle can be taken into account as a function of the time elapsed from the start of integration and the sine of the geographic latitude of the location of measurement. If rotation speed sensor 11 is at rest, this angle 14 caused by the rotation of the earth can be determined as a function of time. On the basis of this interference determination, the rotation of the earth is compensated for in the following measurement. Rotation speed sensor 11 calibrates itself.

The measurement signals of rotation speed sensor 11 are preferably processed locally in the respective transducer 10. One alternative is to forward rotation speed 13 unprocessed to a central processing unit, which performs the integration. The respective data can be transmitted by wire, by radio or via infrared beams.

One or more transducers 10 are needed for axis alignment. Their data is processed by a central display and operating device.

Figure 3:
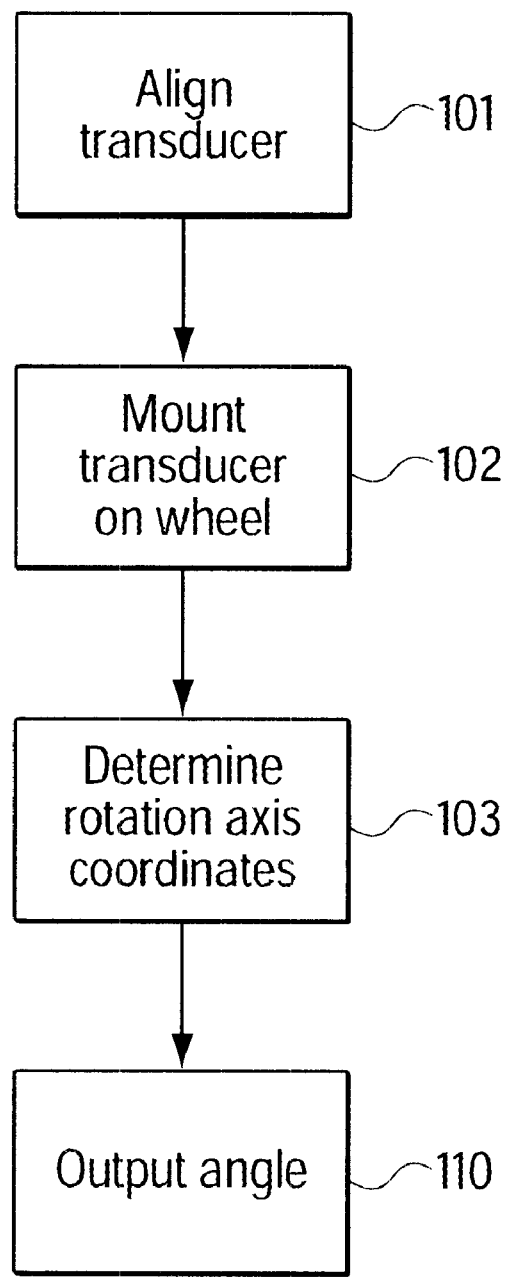
FIG. 3 shows a flow chart of an exemplary embodiment of a method according to the present invention.

FIG. 3 shows and exemplary embodiment of an axis alignment procedure according to the present invention. Transducers 10 provided for axis alignment are aligned in step 101. For this purpose, the respective transducer 10 is brought into alignment with reference direction 20 in a known orientation. The coordinates of a measuring table, for example, are used as reference direction 20, as shown in FIG. 2. Transducer 10 must be arranged so that the rotation axes of rotation speed sensors 11 in transducer 10 are offset by a known angle with respect to the respective axes of reference direction 20. For the sake of simplicity, it shall be furthermore assumed that transducer 10 is aligned when the axes of rotation speed sensors 11 of transducer 10 are parallel to the axes of reference direction 20. The known offset angle obtained between the axes of rotation speed sensors 11 and reference direction 20 is zero. These initial values are stored in the central processing unit, which determines the trail angle. Since only angle differences are relevant for the trail and camber angles, it is sufficient to arrange transducers 10 at a certain known angular offset to one another. After alignment of step 101, integration of the respective rotation speeds 13 is started.

The transducers are then mounted on wheels 15a, 15b in step 102. Transducers 10 can be attached to the wheel in any desired manner; no special alignment is needed in respect to the wheel 15a, 15b to be aligned. For example, mounting devices may be provided on the wheel rims for this purpose. Attachment of transducers 10 via clamps or magnets is also conceivable. No alignment to the respective wheel axle is needed. Angles 14 by which the coordinate system formed by the axes of rotation speed sensors 11 has rotated with respect to reference direction 20 since the time of start of the integration are determined by integration of rotation speeds 13.

Then rotation axis coordinates 21a, 21b of wheels 15a, 15b, respectively, are determined in step 103. For this purpose, transducer 10 determines the rotation and wobbling motion experienced by transducer 10 due to the rotation of wheel 15a, 15b. The wheel can be lifted or rolled for this purpose. The procedure for determining the rotation axis coordinate with lifted wheel is known as rim impact compensation and described, for example, in German Patent Application No. 29 11 580. In rim impact compensation, the vehicle is rolled through approximately two-thirds of a wheel rotation at the place of measurement, such as a lift platform or shop pit. Thus it becomes known by what angle the respective rotation axis coordinates 21a, 21b of the respective wheels 15a, 15b deviate from the reference direction 20.

The desired angles 14 are determined and output in step 110. The angular offset between rotation axis coordinates 21a, 21b and reference direction 20 and thus also between the individual rotation axis coordinates 21a, 21b is known and is sent to the central computer, which calculates the trail angle or camber angle from this value. If steerable wheels 15a, 15b are located on rotating platforms, the caster or steering axis inclination can also be determined. This is described, for example, in "Steering geometry and caster measurement" by D. B. January, SAE Paper, Detroit 1985.

The measurement can be verified by returning previously utilized transducers 10 to their initial position after completion of the measurement, as described for step 101. In the case of a correct measurement, angles 14 formed on transducers 10 should not significantly differ from zero. If considerable differences appear, this should be communicated to the user.

A combination of the device and the method combines their specific advantages.

Alternative embodiments aim at simplifying transducer 10.

When one of rotation speed sensors 11, whose rotation axis is horizontal, is not used, changes in direction with respect to this sensor can be determined using a pendulum system.

Another simplification of transducer 10 using only one rotation speed sensor 11 to measure the changes in direction in the horizontal plane is possible when transducers 10 are transported and used essentially vertically. For this purpose, transducers 10 are moved suspended and attached to the essentially horizontal wheel adapters so that they can oscillate in one plane in order to determine the trail angle. Such a rotation speed sensor 11 with limited degrees of freedom can be implemented, for example, using a pendulum suspended on two threads and performing oscillations in one plane.

In another embodiment only one rotation speed sensor 11 is used to bring the latter into a known position with respect to a basically vertical reference direction 20 in order to determine changes in direction in the vertical plane, for example, in order to determine the camber angle.

The required measurements can be basically performed sequentially, for which only one transducer 10 is needed. The measured value processor is informed when a measurement on a certain wheel 15 is completed. The rotation of the earth as an interfering component must be continuously compensated.

What is claimed is:

1. A device for aligning at least one axle of a vehicle, comprising:

at least one transducer for determining at least one angle between a wheel of the vehicle and a reference direction, the at least one transducer including at least one rotation speed sensor having an output signal which is integrated.

2. The device according to claim 1, wherein the at least one rotation speed sensor includes three rotation speed sensors forming an orthogonal system.

3. The device according to claim 1, wherein the reference direction is selected independently from the vehicle.

4. The device according to claim 1, wherein the at least one transducer is situated in a predetermined position with respect to the reference direction, and wherein the at least one transducer is mounted on a single wheel of the vehicle.

5. A method for aligning at least one axle of a vehicle having at least one transducer, comprising the steps of:

(a) arranging the at least one transducer in a predetermined position with respect to a reference direction;

(b) after step (a), mounting the at least one transducer on a single wheel of the vehicle; and (c) determining an angle of the at least one transducer with respect to the reference direction, the at least one transducer including at least one rotation speed sensor having an output signal which is integrated, the angle formed on the single wheel being a measure of a direction of the at least one axle.

6. The method according to claim 5, further comprising the step of:

(d) after step (b), determining a relative position of rotation axis coordinates of the single wheel with respect to the reference direction.

7. The method according to claim 6, further comprising the steps of:

(f) after step (d), repeating step (a) to obtain a further angle; and (g) if the further angle is substantially different from zero, determining that the angle is invalid.

8. The method according to claim 5, further comprising the step of:

(e) during step (c), compensating for an influence of a rotation of earth.

* * * * *